(12) United States Patent
Ono

(10) Patent No.: US 9,948,897 B2
(45) Date of Patent: Apr. 17, 2018

(54) SURVEILLANCE CAMERA MANAGEMENT DEVICE, SURVEILLANCE CAMERA MANAGEMENT METHOD, AND PROGRAM

(71) Applicant: Sony Corporation, Tokyo (JP)

(72) Inventor: Yuji Ono, Kanagawa (JP)

(73) Assignee: Sony Corporation, Tokyo (JP)

( * ) Notice: Subject to any disclaimer, the term of this patent is extended or adjusted under 35 U.S.C. 154(b) by 162 days.

(21) Appl. No.: 14/401,297

(22) PCT Filed: Mar. 15, 2013

(86) PCT No.: PCT/JP2013/057564
§ 371 (c)(1),
(2) Date: Nov. 14, 2014

(87) PCT Pub. No.: WO2013/175836
PCT Pub. Date: Nov. 28, 2013

(65) Prior Publication Data
US 2015/0130947 A1    May 14, 2015

(30) Foreign Application Priority Data

May 23, 2012  (JP) ................................. 2012-117277

(51) Int. Cl.
*H04N 7/18* (2006.01)
*G08B 13/196* (2006.01)
(52) U.S. Cl.
CPC ....... *H04N 7/181* (2013.01); *G08B 13/19608* (2013.01); *G08B 13/19645* (2013.01); *G08B 13/19693* (2013.01); *G08B 13/19641* (2013.01)
(58) Field of Classification Search
None
See application file for complete search history.

(56) References Cited

U.S. PATENT DOCUMENTS

| 8,576,235 | B1 * | 11/2013 | Sumner .................. G06T 13/20 345/473 |
| 2004/0257444 | A1 * | 12/2004 | Maruya ............ G08B 13/19645 348/169 |

(Continued)

FOREIGN PATENT DOCUMENTS

| CN | 102436662 | 5/2012 |
| GB | 2 384 128 A | 7/2003 |

(Continued)

OTHER PUBLICATIONS

Makris et al., Bridging the gaps between cameras. Proceedings of the 2004 IEEE Computer Society Conference on Computer Vision and Pattern Recognition. Jun. 27-Jul. 2, 2004. Washington DC, USA. vol. 2, Jun. 27, 2004, pp. 205-210, XP010708656. doi:10.1109/CVPR.2004.1315165. ISBN: 978-0-7695-2158-9.

*Primary Examiner* — Andy Rao
*Assistant Examiner* — Samuel D Fereja
(74) *Attorney, Agent, or Firm* — Wolf, Greenfield & Sacks, P.C.

(57) ABSTRACT

The surveillance areas of cameras registered on a map having a surveillance region set thereon are projected onto the map. The shortest paths between the cameras registered on the map are searched for. Links between the cameras are determined based on the surveillance areas of the cameras projected on the map and the shortest paths between the cameras detected on the map. Unlike a conventional technique by which link information is manually acquired, this technique does not require a surveillance object to walk around so as to be actually captured by all the cameras, and can be applied even in a case where there is congestion in the surveillance region. Accordingly, the load on the user can be reduced.

7 Claims, 12 Drawing Sheets

(56) References Cited

U.S. PATENT DOCUMENTS

| | | | |
|---|---|---|---|
| 2005/0012817 A1* | 1/2005 | Hampapur | H04N 7/185 |
| | | | 348/143 |
| 2006/0066723 A1* | 3/2006 | Iwase | G08B 13/19608 |
| | | | 348/169 |
| 2008/0088706 A1 | 4/2008 | Girgensohn et al. | |
| 2008/0123900 A1* | 5/2008 | Ma | G06K 9/32 |
| | | | 382/103 |
| 2008/0198231 A1 | 8/2008 | Ozdemir et al. | |
| 2008/0291278 A1* | 11/2008 | Zhang | G06K 9/00771 |
| | | | 348/159 |
| 2009/0268033 A1 | 10/2009 | Ukita | |
| 2010/0002082 A1 | 1/2010 | Buehler et al. | |
| 2010/0106420 A1* | 4/2010 | Mattikalli | G06T 17/05 |
| | | | 702/2 |
| 2010/0141767 A1* | 6/2010 | Mohanty | H04N 7/181 |
| | | | 348/159 |
| 2010/0208941 A1* | 8/2010 | Broaddus | G01S 3/7864 |
| | | | 382/103 |
| 2010/0214417 A1 | 8/2010 | Gennari et al. | |
| 2010/0293220 A1 | 11/2010 | Gennari et al. | |
| 2012/0206605 A1 | 8/2012 | Buehler et al. | |
| 2013/0011013 A1* | 1/2013 | Takiguchi | G01C 21/3602 |
| | | | 382/103 |
| 2015/0170354 A1 | 6/2015 | Mukai | |

FOREIGN PATENT DOCUMENTS

| | | |
|---|---|---|
| GB | 2 482 127 A | 1/2012 |
| JP | 2006-072708 A | 3/2006 |
| JP | 2007-533280 A | 11/2007 |
| JP | 2008-099248 A | 4/2008 |
| JP | 2008-537380 A | 9/2008 |
| JP | 2009-017179 A | 1/2009 |
| JP | 2010-528515 A | 8/2010 |
| WO | WO 2007/026744 A1 | 8/2007 |

\* cited by examiner

*FIG. 5*

◯ : MOVEMENT ALLOWED REGION (SUCH AS PASSAGE)

☐ : REGION OTHER THAN ABOVE (SUCH AS WALL)

| Weight | 1 | $\sqrt{2}$ | $\alpha$ |
|---|---|---|---|
| | ◯→◯ | ◯↘◯ | ◯→☐ |
| | | | ◯↘☐ |
| | | | ☐→☐ |
| | | | ☐↘☐ |

FIG. 10
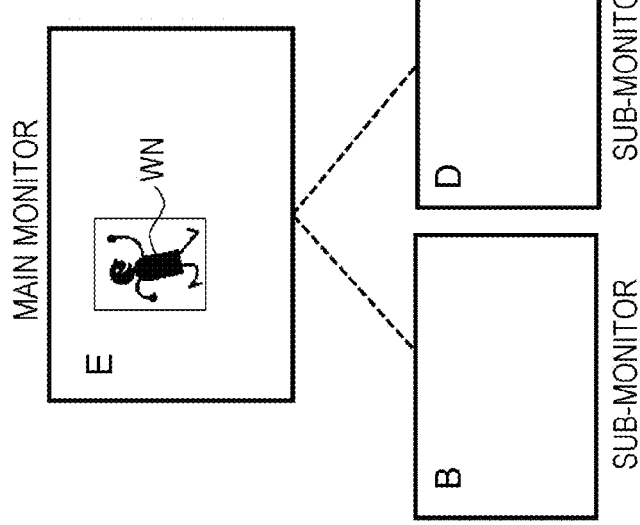
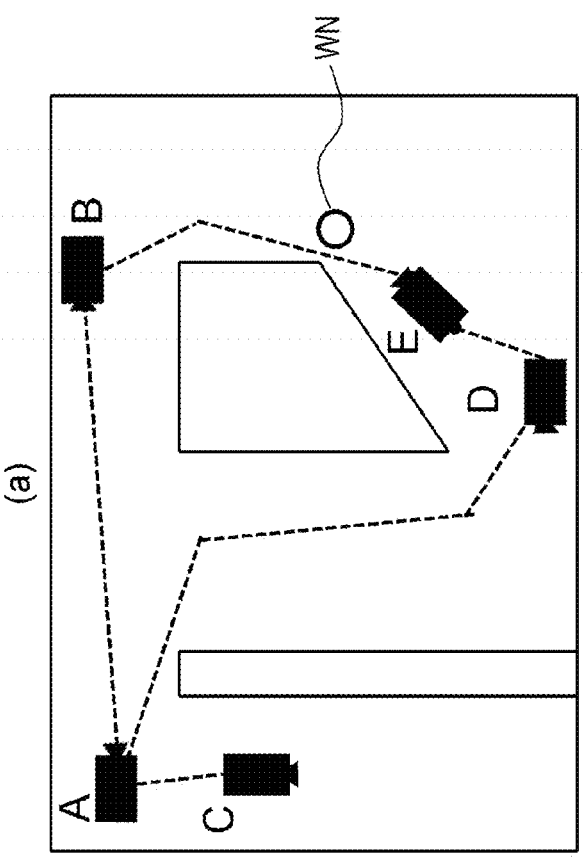
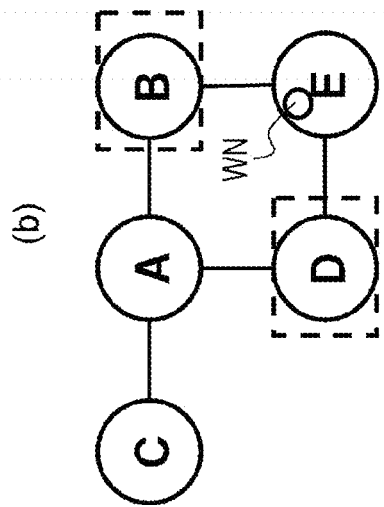

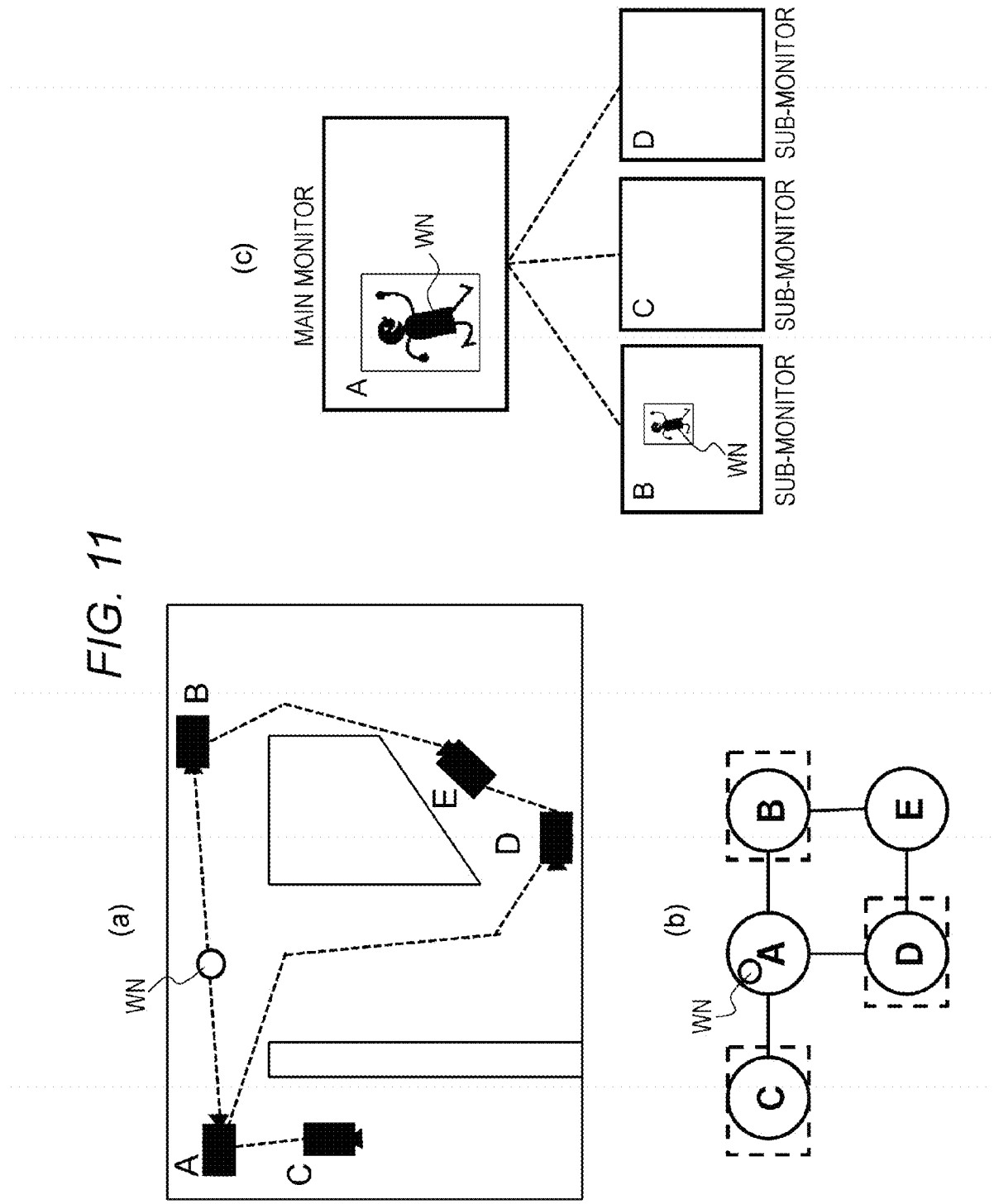

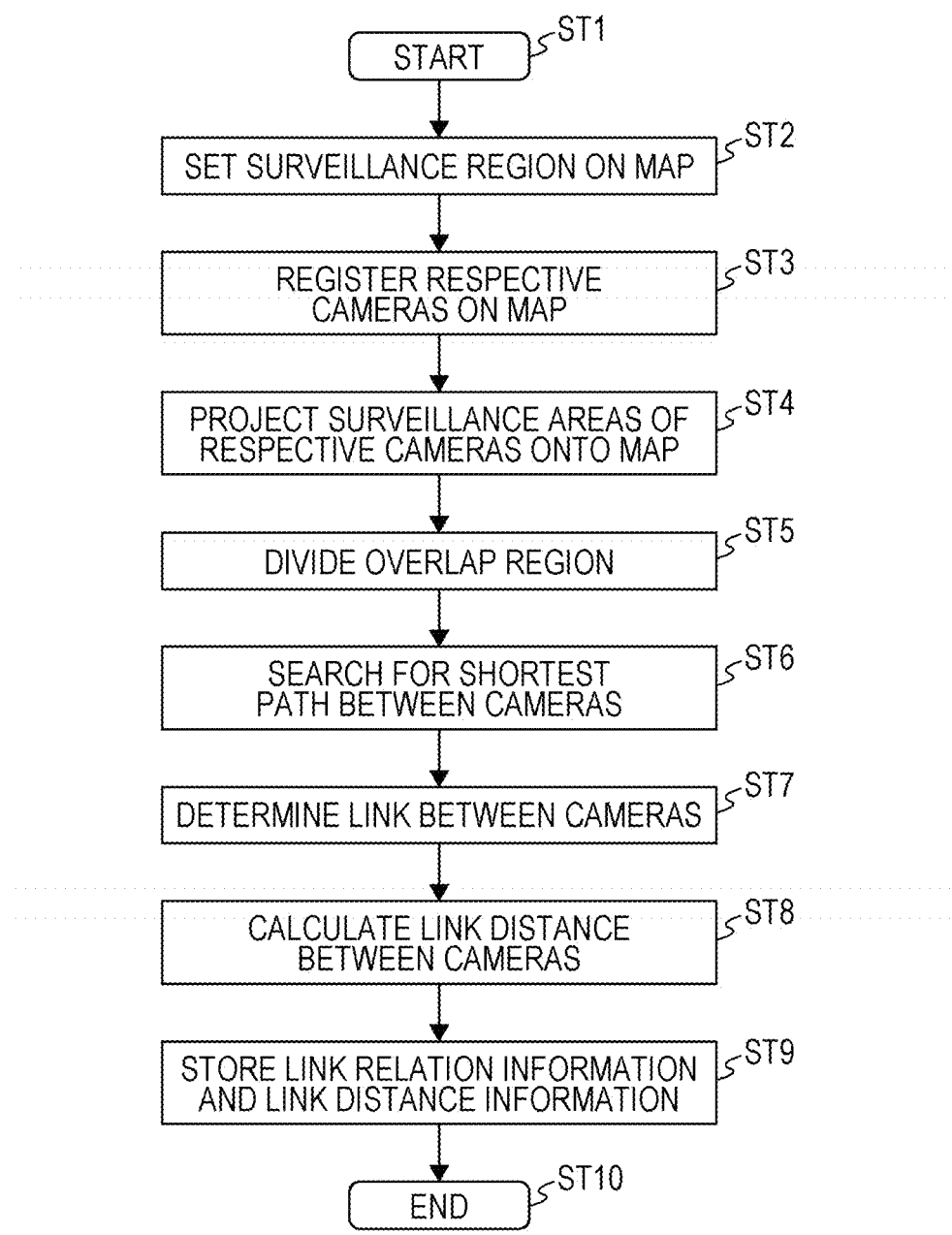

SURVEILLANCE CAMERA MANAGEMENT DEVICE, SURVEILLANCE CAMERA MANAGEMENT METHOD, AND PROGRAM

TECHNICAL FIELD

The present technique relates to surveillance camera management devices, surveillance camera management methods, and programs, and more particularly, to a surveillance camera management device that manages surveillance cameras that monitor floors, an urban area, or the like.

BACKGROUND ART

Video surveillance systems for security, marketing, or the like have been installed in hotels, buildings, convenience stores, and the likes. With such surveillance systems, operations are being conducted everywhere to monitor how suspicious individuals move or how customers move on the floor. In an application for tracking a person between cameras, advance calibration of positional relationship on the floor is essential in increasing accuracy. However, if such calibration needs to be conducted manually, the load on the surveillance agent becomes very large.

There have been techniques suggested for automatically estimating link relations between cameras based on camera images. For example, Patent Document 1 discloses a technique for estimating the link relations between cameras based on the frequency distributions of the appearance times and the disappearance times of all the surveillance objects extracted by the respective cameras. Also, Patent Document 2 discloses a technique for calculating similarities between objects based on color features or the like to determine whether the objects are the same person, and generating the link relations between cameras, for example.

CITATION LIST

Patent Document

Patent Document 1: JP 2007-533280 A
Patent Document 2: JP 2009-017179 A

SUMMARY OF THE INVENTION

Problems to be Solved by the Invention

By the technique disclosed in Patent Document 1, it is difficult to conduct detection in a place where occlusion often occurs such as a constantly congested area. Therefore, the appearance times and the disappearance times necessary for acquiring link relations are not accurately calculated, and it is difficult to obtain high-precision link relation information. By the technique disclosed in Patent Document 2, there is a large amount of wrongly matched data in determining whether objects are the same person between cameras, and therefore, the accuracy of the link relation information to be obtained is low. By these two techniques, a large number of samples are required to obtain high-precision information about the link relations between cameras. Therefore, the person to be sampled needs to move across all the areas in the surveillance region, and the period of time required to obtain the information about the link relations between cameras is uncertain.

The object of the present technique is to accurately and readily acquire information about link relations between cameras.

Solutions to Problems

The concept of the present technique lies in a surveillance camera management device that includes:

a surveillance area projection unit that projects surveillance areas of cameras onto a map having a surveillance region set thereon, the cameras being registered on the map;

a shortest path search unit that searches for a shortest path between the cameras registered on the map; and a link determination unit that determines a link between the cameras based on the surveillance areas of the cameras projected onto the map and the shortest path between the cameras detected on the map.

In the present technique, the cameras are managed on the map. The surveillance areas of cameras registered on a map having a surveillance region set thereon are projected onto the map by the surveillance area projection unit. This projection is conducted based on parameters such as the installation heights, the elevation angles, and the rotation angles of the respective cameras, and further on parameters such as the focal lengths, the image coordinate centers, the lens strain coefficients, and the image coordinate aspect ratios of the respective cameras, which are set in advance.

The shortest path search unit searches for the shortest paths between the cameras registered on the map. The camera link determination unit then determines links between the cameras based on the surveillance areas of the cameras projected on the map and the shortest paths between the cameras detected on the map.

For example, when the shortest path traced from a first camera to a second camera reaches the second camera or the surveillance area of the second camera without coming into contact with a surveillance area other than the surveillance area of the first camera, the link determination unit determines that the first camera and the second camera are linked to each other.

As described above, according to the present technique, links between cameras are determined based on the surveillance areas of the cameras projected onto a map and the shortest paths between the cameras detected on the map, and information about the link relations between the cameras can be accurately and readily acquired. Unlike a conventional technique by which link relation information is manually acquired, this technique does not require a surveillance object to walk around so as to be actually captured by all the cameras, and can be applied even in a case where there is congestion in the surveillance region. Accordingly, the load on the user can be reduced.

According to the present technique, the link determination unit may further calculate the link distance between cameras determined to be linked to each other, for example. This link distance is information useful for obtaining a reference time to be required between disappearance of a surveillance object from the surveillance area of a certain camera and appearance of the surveillance object in front of a camera linked to the certain camera, for example.

In this case, when the shortest path traced from the first camera to the second camera determined to be linked to each other reaches the second camera or the surveillance area of the second camera after exiting the surveillance area of the first camera, the link determination unit may determine the link distance between the first camera and the second camera to be the distance from the exit of the surveillance area of the first camera to the second camera or the entrance of the surveillance area of the second camera, for example. When the shortest path traced from the first camera to the second camera determined to be linked to each other reaches the second camera or the surveillance area of the second camera from the first camera without coming into contact with the surveillance area of the first camera, the link determination unit may determine the link distance between the first camera and the second camera to be the distance from the registered position of the first camera to the second camera or the entrance of the surveillance area of the second camera, for example.

Also, according to the present technique, if there is an overlap region between the surveillance areas of cameras, the surveillance area projection unit may divide the overlap region between the respective cameras, for example. In this case, the surveillance area projection unit may divide the overlap region between the cameras, taking into account projection accuracy. As the overlap region is divided between the cameras, the surveillance object shown in a larger size and in greater detail in a camera image can be displayed in the form of a pop-up, for example.

Also, according to the present technique, the surveillance camera management device may further include an output camera image select unit that selects output camera images from among camera images based on an inter-camera link relation acquired by the link determination unit, for example. In this case, when selecting a camera image of a predetermined camera to be output to a main monitor, the output camera image select unit may select camera images of a predetermined number of cameras linked to the predetermined camera as the camera images to be output to sub-monitors, for example. In this case, even if the number of monitors is small, camera images for tracking the surveillance object can be efficiently displayed.

Effects of the Invention

According to the present technique, information about the link relations between cameras can be accurately and readily acquired.

BRIEF DESCRIPTION OF DRAWINGS

FIG. 5 is a diagram showing examples of weights between the pixels forming paths in shortest path searches.

FIGS. 10(a) to 10(c) are diagrams for explaining an example of an output camera image select process based on inter-camera link relation information.

FIGS. 11(a) to 11(c) are diagrams for explaining another example of an output camera image select process based on inter-camera link relation information.

FIG. 12 is a flowchart showing an example flow of a process operation to be performed until the link relation information and the link distance information about the respective cameras are stored into the surveillance camera management unit.

MODES FOR CARRYING OUT THE INVENTION

Figure 1:
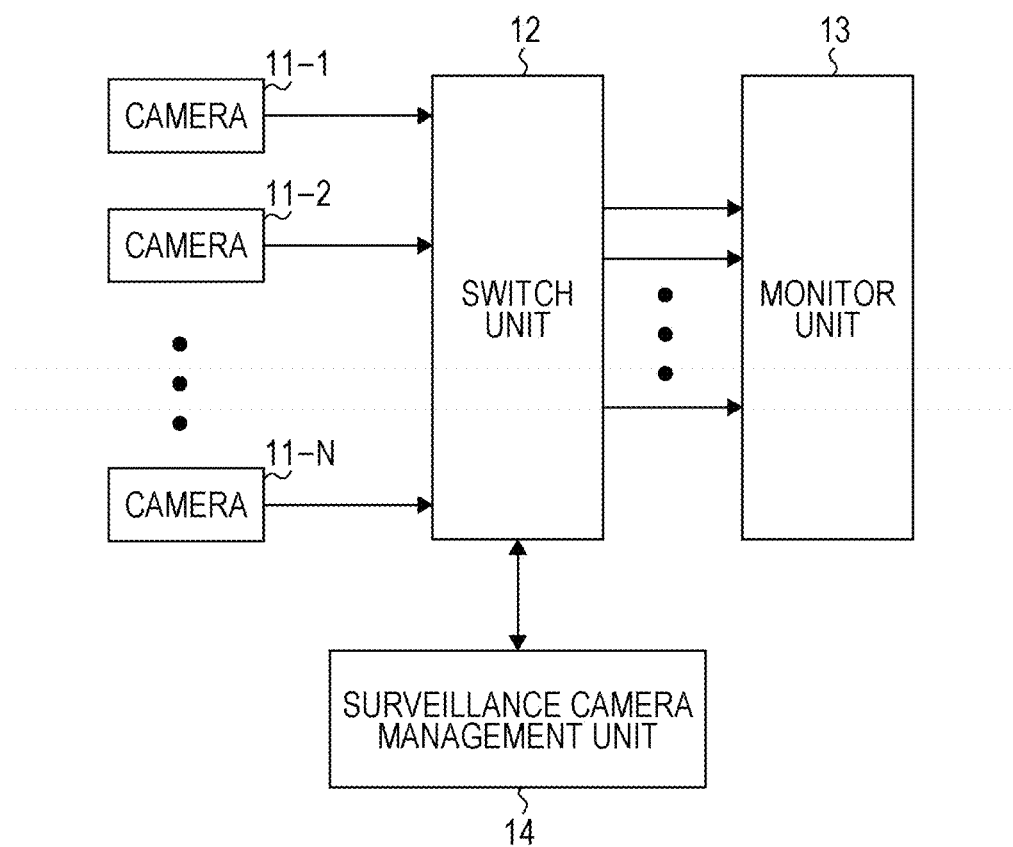
FIG. 1 is a block diagram showing an example structure of a surveillance camera system as an embodiment.

The following is a mode for carrying out the invention (hereinafter referred to as the "embodiment"). Explanation will be made in the following order.
1. Embodiment
2. Modifications 1. Embodiment Example Structure of a Surveillance Camera Management System FIG. 1 shows an example of a surveillance camera system 10 as an embodiment. This surveillance camera system 10 includes cameras 11-1 through 11-N, a switch unit 12, a monitor unit 13, and a surveillance camera management unit 14.

The cameras 11-1 through 11-N are surveillance cameras that are placed on floors, in an urban area, or the like. Under the control of the surveillance camera management unit 14, the switch unit 12 selectively extracts a predetermined number of camera images from among camera images obtained with the cameras 11-1 through 11-N, and supplies the extracted camera images to the monitor unit 13. The monitor unit 13 includes a predetermined number of monitors, such as one main monitor and sub-monitors, and displays a camera image. The surveillance camera management unit 14 acquires inter-camera link relation information, and controls operation of the switch unit 12 and the like based on the link relation information and the like.

Figure 2:
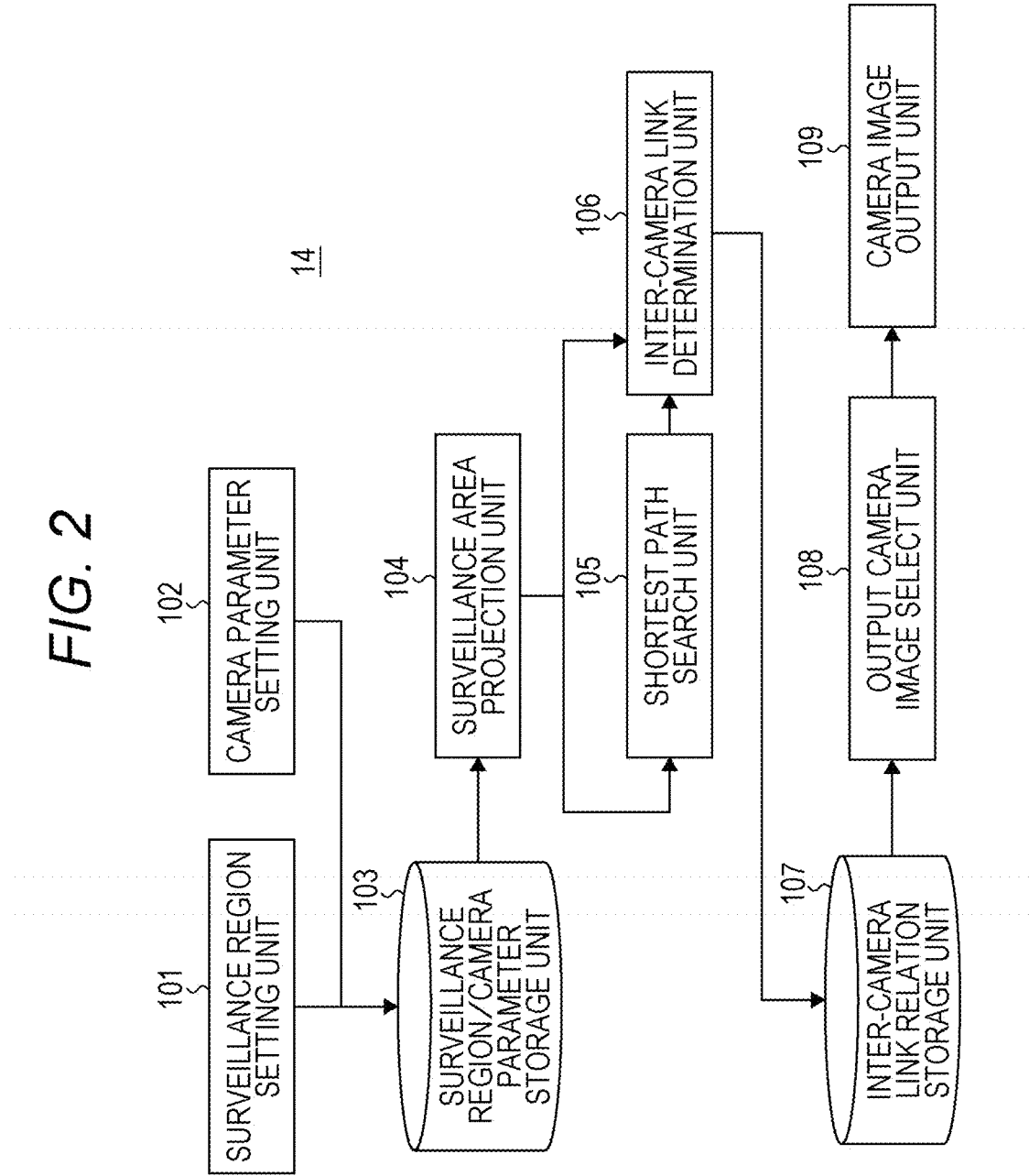
FIG. 2 is a block diagram showing an example structure of the surveillance camera management unit of the surveillance camera system.

FIG. 2 shows an example structure of the surveillance camera management unit 14. Using a computer that handles map data, the surveillance camera management unit 14 manages the cameras (surveillance cameras) 11-1 through 11-N on a scaled-down map showing the above mentioned floors, the above mentioned urban area, or the like. The surveillance camera management unit 14 includes a surveillance region setting unit 101, a camera parameter setting unit 102, a surveillance region/camera parameter storage unit 103, a surveillance area projection unit 104, a shortest path search unit 105, and an inter-camera link determination unit 106. The surveillance camera management unit 14 also includes an inter-camera link relation storage unit 107, an output camera image select unit 108, and a camera image output unit 109.

Figure 3:
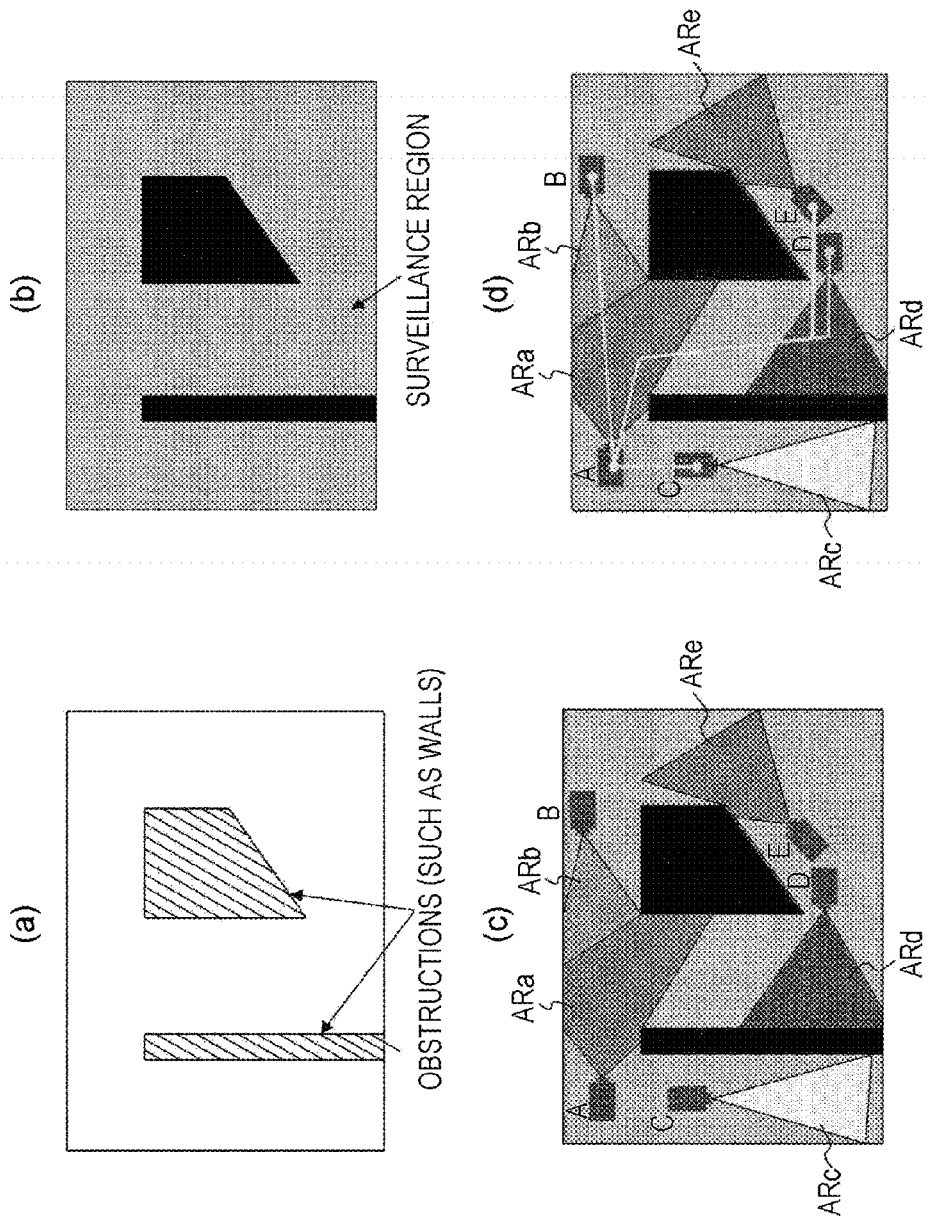
FIGS. 3(a) to 3(d) are diagrams for explaining processes to be performed by the surveillance camera management unit.

The surveillance region setting unit 101 sets a surveillance region on the map based on a user operation. FIG. 3(a) shows an example of a map displayed on the monitor (not shown) of the surveillance camera management unit 14. FIG. 3(b) shows an example of a surveillance region that is set on the map. In this case, the surveillance region that is set excludes obstruction regions such as walls.

The camera parameter setting unit 102 sets camera parameters of the cameras (surveillance cameras) 11-1 through 11-N based on user operations. The camera parameters are information for projecting the surveillance areas of the respective cameras onto the map. The camera parameters include information about the installation positions of the respective cameras. The camera parameters also include information such as the installation heights, the elevation angles, and the rotation angles of the respective cameras, and further include information such as the focal lengths, the image coordinate centers, the lens strain coefficients, and the image coordinate aspect ratios of the respective cameras.

The surveillance region/camera parameter storage unit 103 stores the information about the surveillance region that is set by the surveillance region setting unit 101, and the camera parameters of the respective cameras that are set by the camera parameter setting unit 102. The surveillance area projection unit 104 projects the surveillance areas of the respective cameras onto the map based on the surveillance region and the camera parameters of the respective cameras.

In this case, the surveillance area projection unit 104 registers the respective cameras on the map based on the installation position information about the respective cameras. The surveillance area projection unit 104 also determines surveillance areas to be projected onto the map based on other information about the respective cameras. FIG. 3(c) shows an example of the respective cameras registered on the map and the respective projected surveillance areas.

In this example, there are five cameras A through E, and the surveillance area ARa of the camera A, the surveillance area ARb of the camera B, the surveillance area ARc of the camera C, the surveillance area ARd of the camera D, and the surveillance area ARe of the camera E are projected.

Figure 4:
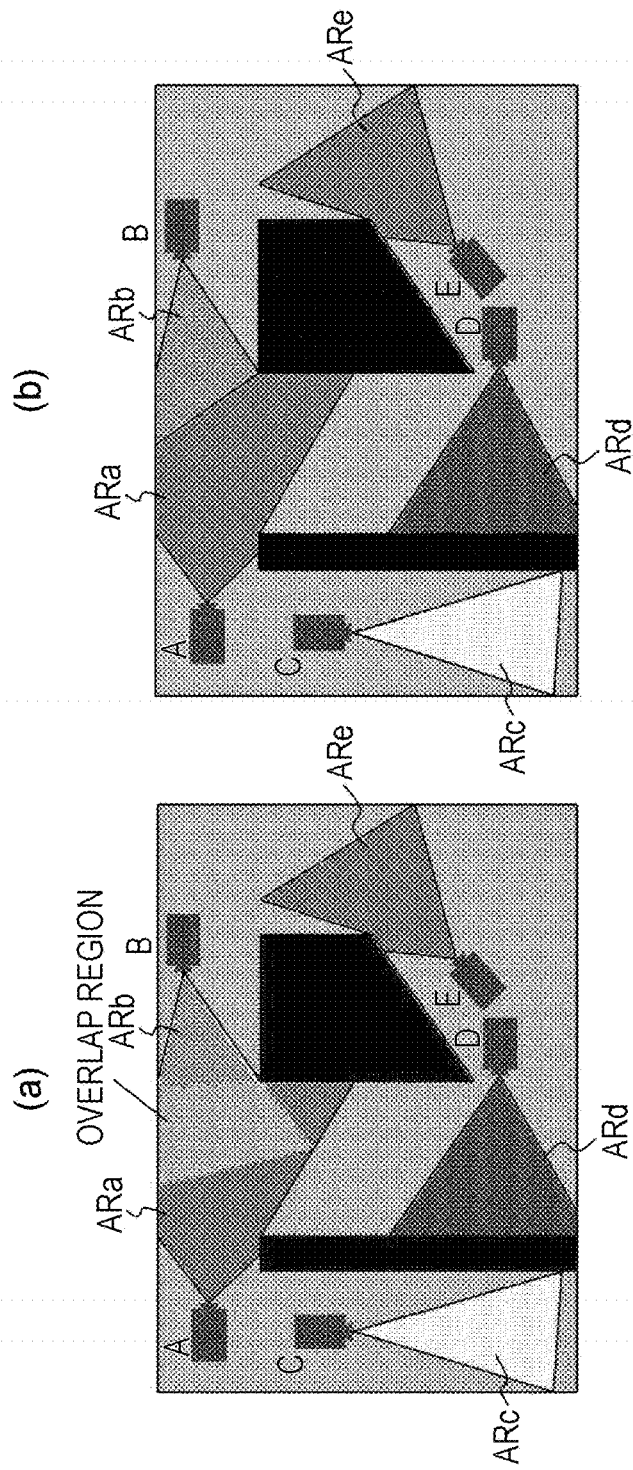
FIGS. 4(a) and 4(b) are diagrams for explaining dividing a camera surveillance area overlap region between the respective cameras.

In this example, the surveillance area ARa of the camera A and the surveillance area ARb of the camera B are in contact with each other and are joined together. For example, these surveillance areas ARa and ARb are determined by dividing a surveillance area overlap region between the respective cameras. FIG. 4(a) shows a situation where there is an overlap region between the surveillance area ARa of the camera A and the surveillance area ARb of the camera B, and FIG. 4(b) shows a situation where the overlap region has been divided as shown in FIG. 3(c).

The surveillance area projection unit 104 assigns each of the pixels included in the overlap region to the surveillance area ARa of the camera A or the surveillance area ARb of the camera B, taking into account projection accuracy, for example. Specifically, pixels in which the projection accuracy of the camera A is higher are assigned to the surveillance area ARa of the camera A, and pixels in which the projection accuracy of the camera B is higher are assigned to the surveillance area ARb of the camera B. The dividing of the overlap region may be performed simply by assigning each pixel to the closer camera surveillance area in terms of distance. Not only an overlap region between the surveillance areas of two cameras but also an overlap region among the surveillance areas of three or more cameras can be divided in the same manner as above.

The shortest path search unit 105 searches for the shortest paths between the cameras registered on the map. In this case, the shortest path search unit 105 uses a conventional technique such as Dijkstra's method. FIG. 5 shows examples of weights between pixels that form paths. Here, "○" represents a pixel in a surveillance region or a movement-allowed region such as a passage. Also, "□" represents a pixel in a surveillance region or a movement-prohibited region such as a wall. It should be noted that "α" is set at a sufficiently large value. FIG. 3(d) shows an example of the detected shortest paths between the camera A and the other cameras.

The inter-camera link determination unit 106 determines links between the cameras based on the surveillance areas of the cameras projected by the surveillance area projection unit 104 and the shortest paths between the cameras detected by the shortest path search unit 105. For example, where the two cameras to be subjected to link determination are a first camera and a second camera, the link determination is performed as described below.

Specifically, when the shortest path from the first camera to the second camera is traced, the two cameras are determined to be linked if the shortest path reaches the second camera or the surveillance area of the second camera with no contact with a surveillance area other than the surveillance area of the first camera. For example, in the example shown in FIG. 3(d), when the shortest path from the camera A to the camera B is traced in link determination on the camera A and the camera B, the shortest path enters the surveillance area of the surveillance area ARb of the camera B immediately after exiting the surveillance area ARa of the camera A. Accordingly, the camera A and the camera B are determined to be linked.

Also, in link determination on the camera A and the camera C, when the shortest path is traced from the camera A to the camera C, the shortest path directly reaches the camera C from the camera A with no contact with the surveillance areas of the respective cameras. Accordingly, the camera A and the camera C are determined to be liked. In link determination on the camera A and the camera D, when the shortest path from the camera A to the camera D is traced, the shortest path enters the surveillance area of the camera D after exiting the surveillance area ARa of the camera A. Accordingly, the camera A and the camera D are determined to be linked.

Also, when tracing the shortest path from the first camera to the second camera, the inter-camera link determination unit 106 determines the two cameras not to be linked if the shortest path reaches the second camera or the surveillance area of the second camera after coming into contact with a surveillance area that is neither the surveillance area of the first camera nor the surveillance area of the second camera. For example, in the example shown in FIG. 3(d), when the shortest path from the camera A to the camera E is traced in link determination on the camera A and the camera E, the shortest path reaches the camera E after exiting the surveillance area ARa of the camera A and coming into contact with the surveillance area of the camera D. Accordingly, the camera A and the camera E are determined not to be linked.

The inter-camera link determination unit 106 further calculates the link distances between the cameras determined to be linked. For example, where the two cameras determined to be linked are the first camera and the second camera, the link distance is calculated as described below.

Specifically, in a case where the shortest path traced from the first camera to the second camera reaches the second camera or the surveillance area of the second camera after exiting the surveillance area of the first camera, the distance from the exit of the surveillance area of the first camera to the second camera or the entrance of the surveillance area of the second camera is set as the link distance between the first camera and the second camera. Also, in a case where the shortest path traced from the first camera to the second camera reaches the second camera or the surveillance area of the second camera from the first camera with no contact with the surveillance area of the first camera, the distance from the registered position of the first camera to the second camera or the entrance of the surveillance area of the second camera is set as the link distance between the first camera and the second camera.

Figure 6:
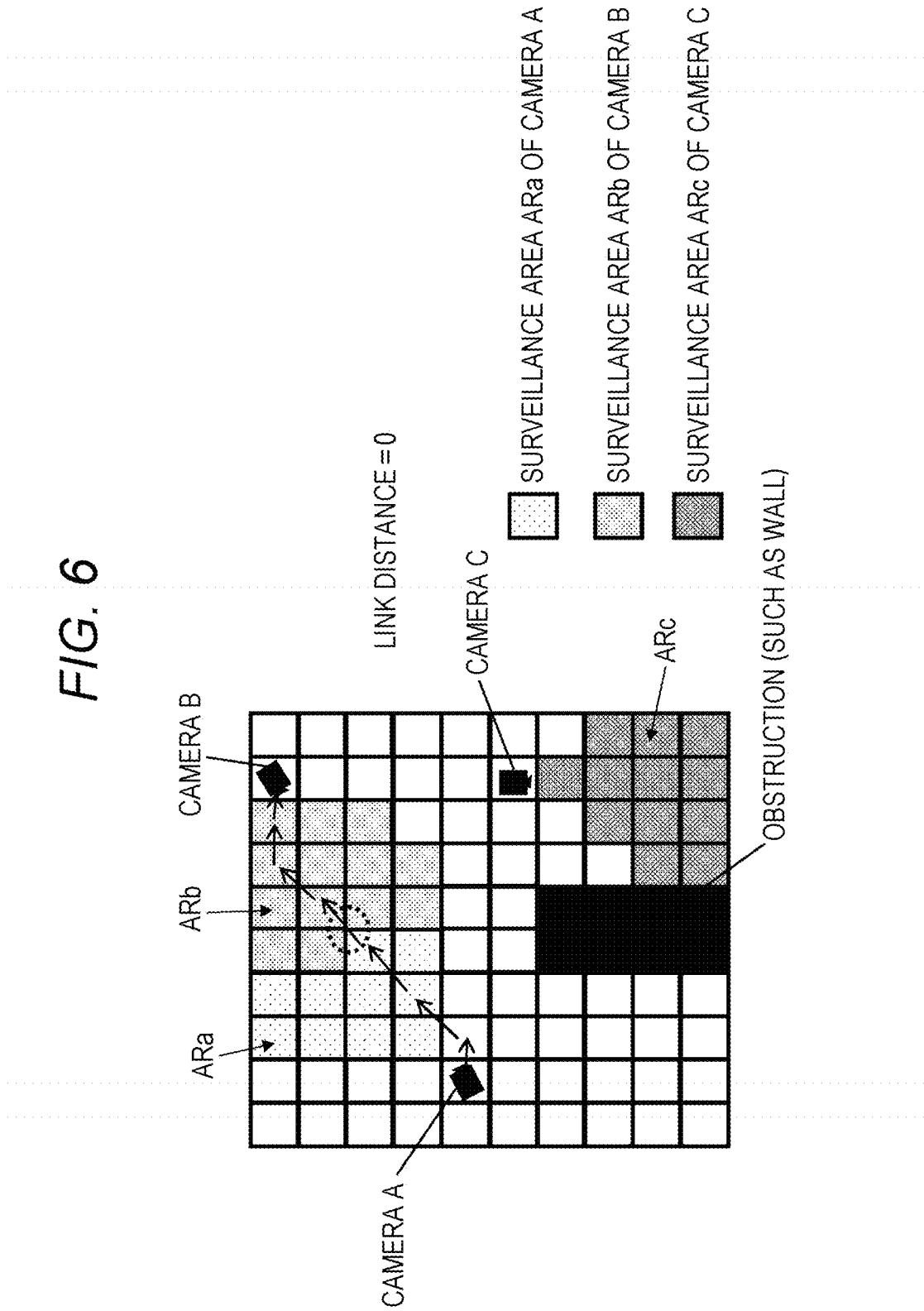
FIG. 6 is a diagram for explaining a specific example of a calculation of the link distance between cameras determined to be linked.

FIG. 6 shows a specific example of a link distance calculation. In this example, there are ten pixels in the horizontal direction and ten pixels in the vertical direction, and the link distance between the camera A and the camera B is to be calculated. In this case, the shortest path enters the surveillance area ARb of the camera B immediately after exiting the surveillance area ARa of the camera A, and accordingly, the link distance is calculated to be "0".

Figure 7:
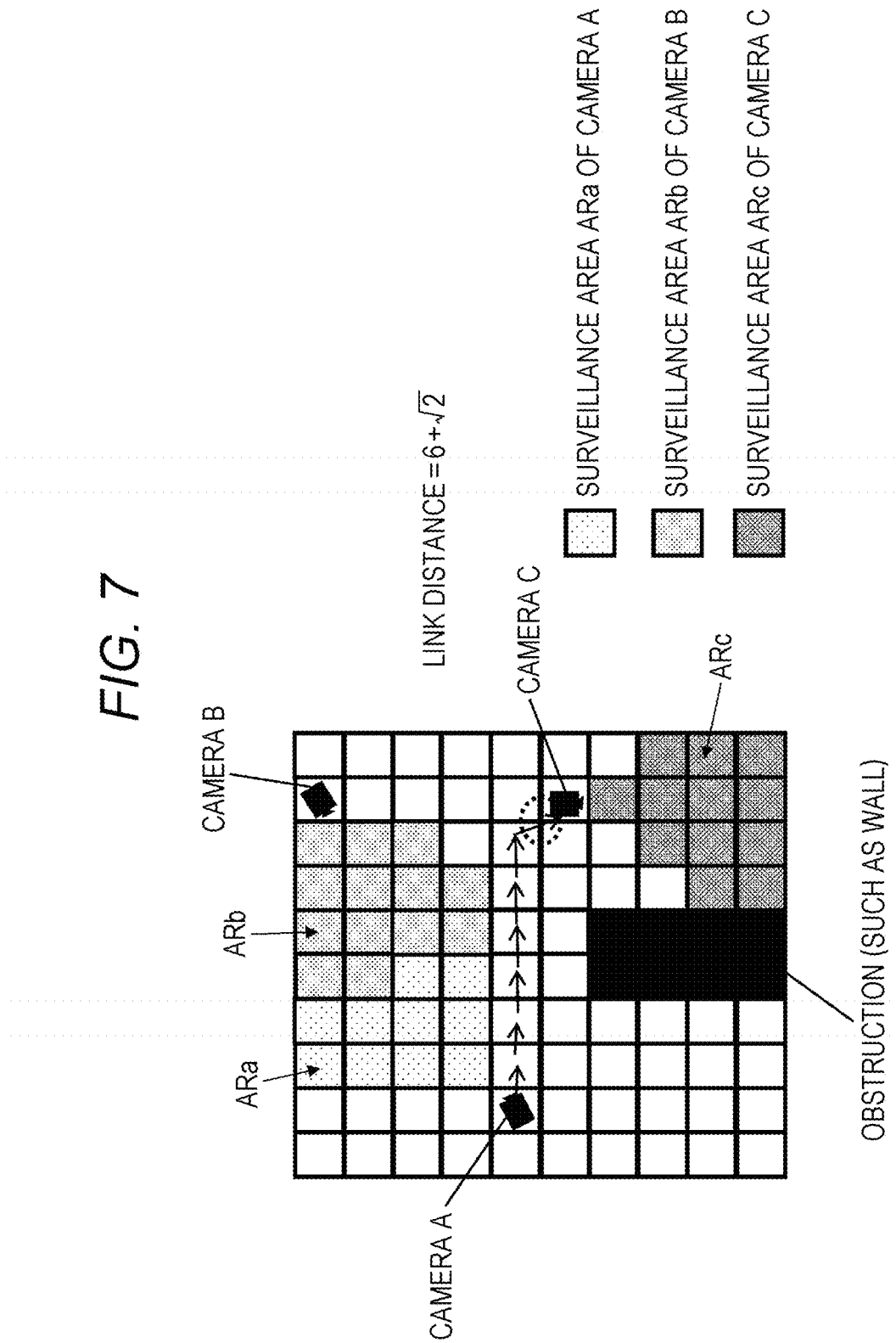
FIG. 7 is a diagram for explaining another specific example of a calculation of the link distance between cameras determined to be linked.

FIG. 7 shows another specific example of a link distance calculation. In this example, there are also ten pixels in the horizontal direction and ten pixels in the vertical direction, and the link distance between the camera A and the camera C is to be calculated. In this case, the shortest path extends six pixels in the horizontal direction from the registered position of the camera A and further extends one pixel in a diagonal direction to reach the camera C. Accordingly, the link distance is calculated as "6+√2".

Figure 8:
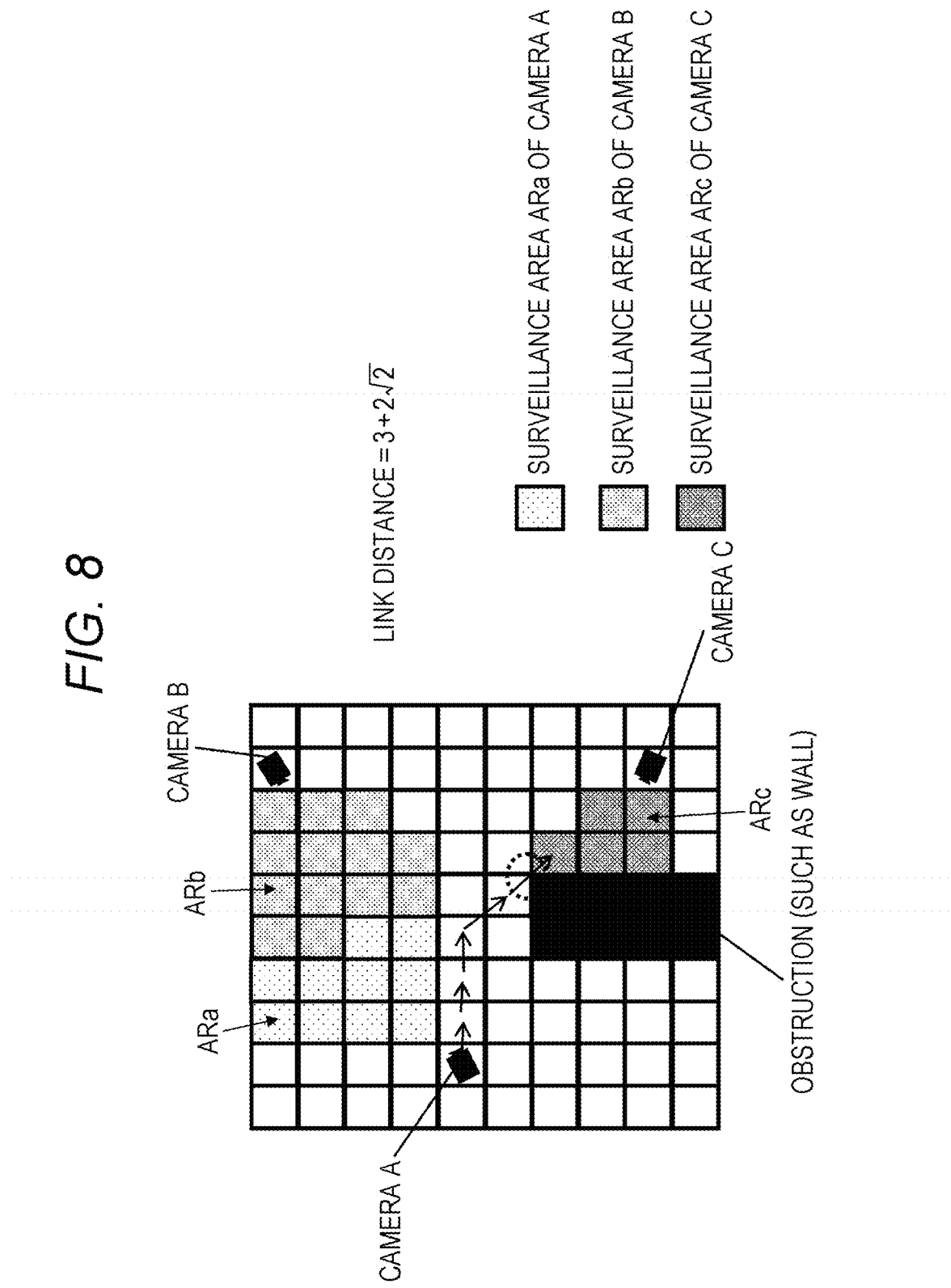
FIG. 8 is a diagram for explaining yet another specific example of a calculation of the link distance between cameras determined to be linked.

FIG. 8 shows yet another specific example of a link distance calculation. In this example, there are also ten pixels in the horizontal direction and ten pixels in the vertical direction, and the link distance between the camera A and the camera C is to be calculated. In this case, the shortest path extends three pixels in the horizontal direction from the registered position of the camera A and further extends two pixels in a diagonal direction to reach the surveillance area of the camera C. Accordingly, the link distance is calculated as "3+2√2".

Figure 9:
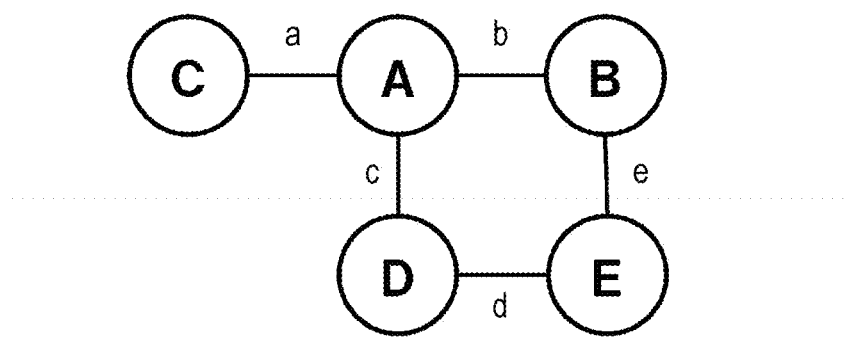
FIG. 9 is a diagram showing an example of link relation information and link distance information.

The inter-camera link relation storage unit 107 stores the link relation information and the inter-camera link distance information obtained by the camera link determination unit 106. FIG. 9 shows an example of the link relation information and the link distance information corresponding to the example shown in FIG. 3(c). In this drawing, A through E in circles represent the respective cameras, and each two cameras connected by a line are linked to each other. The link distances are denoted by a through e.

The inter-camera link relation information stored in the inter-camera link relation storage unit 107 is used as the information for selecting output camera images from among camera images of the cameras as described later, for example. The link distance information stored in the inter-camera link relation storage unit 107 about the cameras determined to be linked is the information useful for obtaining a reference time to be required between disappearance of a surveillance object from the surveillance area of a certain camera and appearance of the surveillance object in the surveillance area of a camera linked to the certain camera.

Based on the inter-camera link relation information stored in the inter-camera link relation storage unit 107, the output camera image select unit 108 selects output camera images from among images of the cameras. The camera image output unit 109 outputs a control signal to the switch unit 12 so that the camera images selected by the output camera image select unit 108 are supplied to the monitor unit 13 (see FIG. 1).

When selecting a camera image of a predetermined camera showing the surveillance object as the camera image to be output to the main monitor, the output camera image select unit 108 selects camera images of a predetermined number of cameras linked to the predetermined camera as the camera images to be output to the sub-monitors.

For example, as shown in FIG. 10(a), the surveillance object WN is located in the surveillance area of the camera E. Therefore, the output camera image select unit 108 selects the camera image of the camera E as the camera image to be output to the main monitor, as shown in FIG. 10(c). In this case, the camera E, the camera B, and the camera D are linked as shown in FIG. 10(b), and therefore, the output camera image select unit 108 selects the camera images of the camera B and the camera D as the camera images to be output to the sub-monitors as shown in FIG. 10(c). Since the surveillance object WN does not exist in the surveillance areas of the camera B and the camera D in this case, the camera images of these cameras do not show the surveillance object WN.

For example, as shown in FIG. 11(a), the surveillance object WN is located in the surveillance area of the camera A. Therefore, the output camera image select unit 108 selects the camera image of the camera A as the camera image to be output to the main monitor, as shown in FIG. 11(c). In this case, the camera A, the camera B, the camera C, and the camera D are linked as shown in FIG. 11(b), and therefore, the output camera image select unit 108 selects the camera images of the camera B, the camera C, and the camera D as the camera images to be output to the sub-monitors as shown in FIG. 11(c).

Although the position of the surveillance object WN overlapped the surveillance area ARb of the camera B, the position has been assigned to the surveillance area ARa of the camera A through a dividing process. Therefore, the camera image of the camera B also shows the surveillance object WN as shown in FIG. 11(c). However, the camera image of the camera A displayed on the main monitor shows the surveillance object WN in a larger size and in greater detail than in the camera image of the camera B displayed on a sub-monitor. That is, since the dividing process is performed, the camera image of the camera having the surveillance area in which the surveillance object WN exists is output to the main monitor, so that a camera image showing the surveillance object WN in a larger size and in greater detail can be displayed as a pop-up on the main monitor.

Operation of the surveillance camera management unit 14 shown in FIG. 2 is now briefly described. The surveillance region setting unit 101 sets a surveillance region on the map based on a user operation (see FIG. 3(b)). Information about the surveillance region that is set in this manner is stored into the surveillance region/camera parameter storage unit 103.

Based on user operations, the camera parameter setting unit 102 also sets the camera parameters (information such as the installation positions of the respective cameras, the installation heights of the respective cameras, the elevation angles, the rotation angles, the focal lengths of the respective cameras, the image coordinate centers, the lens strain coefficients, and the image coordinate aspect ratios) of the cameras (surveillance cameras) 11-1 through 11-N. The camera parameters of the respective cameras that are set in this manner are stored into the surveillance region/camera parameter storage unit 103.

After the surveillance region and the camera parameters are set, the surveillance area projection unit 104 registers the respective cameras on the map and projects the respective surveillance areas onto the map based on the surveillance region and the camera parameters (see FIG. 3(c)). In this case, the respective cameras are registered on the map based on the information about the installation positions of the respective cameras, and the surveillance areas to be projected onto the map are determined based on the other information about the respective cameras.

After the registration of the respective cameras and the projection of the surveillance areas, the shortest path search unit 105 searches for the shortest paths between the cameras registered on the map (see FIG. 3(d)). The inter-camera link determination unit 106 then determines links between cameras based on the surveillance areas of the cameras projected on the map and the shortest paths between the cameras detected on the map. The inter-camera link determination unit 106 also calculates the link distances between the cameras determined to be linked. The link relation information and the link distance information obtained by the inter-camera link determination unit 106 are stored into the inter-camera link relation storage unit 107.

Based on the inter-camera link relation information stored in the inter-camera link relation storage unit 107, the output camera image select unit 108 selects output camera images from among camera images. For example, when a camera image of a predetermined camera showing the surveillance object is selected as the camera image to be output to the main monitor, camera images of a predetermined number of cameras linked to the predetermined camera are selected as the camera images to be output to the sub-monitors. The camera image output unit 109 outputs a control signal to the switch unit 12 so that the camera images selected by the output camera image select unit 108 are supplied to the monitor unit 13.

The flowchart in FIG. 12 shows an example flow of a process operation to be performed until the link relation information and the link distance information about the respective cameras are stored into the surveillance region/camera parameter storage unit 103 in the surveillance camera management unit 14 shown in FIG. 2.

First, in step ST1, the surveillance camera management unit 14 starts the process, and then moves on to the procedure of step ST2. In step ST2, the surveillance camera management unit 14 sets a surveillance region on the map with the surveillance region setting unit 101 based on a user operation. In step ST3, the surveillance camera management unit 14 registers the respective cameras on the map based on the installation position information that is set by the camera parameter setting unit 102 about the respective cameras.

In step ST4, the surveillance camera management unit 14 projects the surveillance areas of the respective cameras onto the map based on the information such as the installation heights of the respective cameras, the elevation angles, the rotation angles, the focal lengths of the respective cameras, the image coordinate centers, the lens strain coefficients, and the image coordinate aspect ratios that are set by the camera parameter setting unit 102. If there is an overlap region between the surveillance areas of the respective cameras projected onto the map in step ST4, the surveillance camera management unit 14 in step ST5 divides the overlap region between the surveillance areas of the respective cameras, taking into account projection accuracy, for example.

In step ST6, the surveillance camera management unit 14 searches for the shortest paths between cameras among the cameras registered on the map. In step ST7, the surveillance camera management unit 14 determines links between cameras by using the detected shortest paths between the cameras and the projected surveillance areas of the respective cameras, and acquires link relation information. In step ST8, the surveillance camera management unit 14 calculates the link distances between the linked cameras. In step ST9, the surveillance camera management unit 14 stores the link relation information acquired in step ST7 and the link distance information acquired in step ST8 into the inter-camera link relation storage unit 107. After the procedure of step ST9, the surveillance camera management unit 14 ends the process in step ST10.

As described above, in the surveillance camera system 10 shown in FIG. 1, the surveillance camera management unit 14 determines links between cameras based on the surveillance areas of the cameras projected on the map and the shortest paths between the cameras detected on the map. Accordingly, the information about the link relations between the cameras can be accurately and readily acquired. Unlike a conventional technique by which link relation information is manually acquired, this technique does not require a surveillance object to walk around so as to be actually captured by all the cameras, and can be applied even in a case where there is congestion in the surveillance region. Accordingly, the load on the user can be reduced.

If there is an overlap region between the surveillance areas of cameras in the surveillance camera system 10 shown in FIG. 1, the surveillance camera management unit 14 divides the overlap region between the respective cameras. Accordingly, a surveillance object shown in a larger size and in greater detail in a camera image can be displayed in the form of a pop-up.

In the surveillance camera system 10 shown in FIG. 1, the surveillance camera management unit 14 selects output camera images from among camera images based on inter-camera link relations. For example, when a camera image of a predetermined camera is selected as the camera image to be output to the main monitor, camera images of a predetermined number of cameras linked to the predetermined camera are selected as the camera images to be output to the sub-monitors. Accordingly, even if the number of monitors is small, camera images for tracking a surveillance object can be efficiently displayed.

2. Modifications

Although the cameras 11-1 through 11-N are connected to the switch unit 12 by wires in the above described embodiment, those cameras may be wirelessly connected to the switch unit 12. Also, the surveillance camera management unit 14 may remotely control the heights, the elevation angles, and the rotation angles of the respective cameras. In such a case, the surveillance camera management unit 14 updates the surveillance areas of the respective cameras or the like every time there is a change in those parameters.

The present technique may also be embodied in the structures described below.

(1) A surveillance camera management device including:
a surveillance area projection unit that projects surveillance areas of cameras onto a map having a surveillance region set thereon, the cameras being registered on the map;
a shortest path search unit that searches for a shortest path between the cameras registered on the map; and
a link determination unit that determines a link between the cameras based on the surveillance areas of the cameras projected onto the map and the shortest path between the cameras detected on the map.

(2) The surveillance camera management device of (1), wherein,
when the shortest path traced from a first camera to a second camera reaches the second camera or the surveillance area of the second camera without coming into contact with a surveillance area other than the surveillance area of the first camera, the link determination unit determines that the first camera and the second camera are linked to each other.

(3) The surveillance camera management device of (1) or (2), wherein the link determination unit further calculates a link distance between the cameras determined to be linked to each other.

(4) The surveillance camera management device of (3), wherein, when the shortest path traced from the first camera to the second camera determined to be linked to each other reaches the second camera or the surveillance area of the second camera after exiting the surveillance area of the first camera, the link determination unit determines the link distance between the first camera and the second camera to be the distance from the exit of the surveillance area of the first camera to the second camera or the entrance of the surveillance area of the second camera, and, when the shortest path traced from the first camera to the second camera determined to be linked to each other reaches the second camera or the surveillance area of the second camera from the first camera without coming into contact with the surveillance area of the first camera, the link determination unit determines the link distance between the first camera and the second camera to be the distance from the registered position of the first camera to the second camera or the entrance of the surveillance area of the second camera.

(5) The surveillance camera management device of any one of (1) through (4), wherein, when there is an overlap region between the surveillance areas of cameras, the surveillance area projection unit divides the overlap region between the cameras.

(6) The surveillance camera management device of (5), wherein the surveillance area projection unit divides the overlap region between the cameras, taking into account projection accuracy.

(7) The surveillance camera management device of any one of (1) through (6), further including an output camera image select unit that selects an output camera image from among camera images based on the inter-camera link relation acquired by the link determination unit.

(8) The surveillance camera management device of (7), wherein, when selecting a camera image of a predetermined camera as the camera image to be output to a main monitor, the output camera image select unit selects camera images of a predetermined number of cameras linked to the predetermined camera as the camera images to be output to sub-monitors.

(9) A surveillance camera management method including:

a surveillance area projection step of projecting surveillance areas of cameras onto a map having a surveillance region set thereon, the cameras being registered on the map;

a shortest path search step of searching for a shortest path between the cameras registered on the map; and a link determination step of determining a link between the cameras based on the surveillance areas of the cameras projected onto the map and the shortest path between the cameras detected on the map.

(10) A program for causing a computer to function as:

a surveillance area projection unit that projects surveillance areas of cameras onto a map having a surveillance region set thereon, the cameras being registered on the map;

a shortest path search unit that searches for a shortest path between the cameras registered on the map; and a link determination unit that determines a link between the cameras based on the surveillance areas of the cameras projected onto the map and the shortest path between the cameras detected on the map.

REFERENCE SIGNS LIST

10 Surveillance camera system
11-1 to 11-N Camera (surveillance camera)
12 Switch unit
13 Monitor unit
14 Surveillance camera management unit
101 Surveillance region setting unit
102 Camera parameter setting unit
103 Surveillance region/camera parameter storage unit
104 Surveillance area projection unit
105 Shortest path search unit
106 Inter-camera link determination unit
107 Inter-camera link relation storage unit
108 Output camera image select unit
109 Camera image output unit

The invention claimed is:

1. A surveillance camera management device comprising:

a processing device and a memory encoded with instructions that, when executed by the processing device, function as:

a surveillance area projection unit configured to project surveillance areas of a plurality of cameras onto a map having a surveillance region set thereon, the cameras being registered on the map;

a shortest path search unit configured to search for a shortest path between the cameras registered on the map;

a link determination unit configured to determine an inter-camera link relation between the cameras based on the surveillance areas of the cameras projected onto the map and the shortest path between the cameras detected on the map, wherein the link determination unit is configured to determine the inter-camera link relation by determining that a first camera and a second camera are linked to each other when the shortest path traced from the first camera to the second camera reaches one of the second camera and the surveillance area of the second camera without coming into contact with a surveillance area other than the surveillance area of the first camera and wherein the link determination unit is further configured to determine the inter-camera link relation by determining that the first camera and the second camera are not linked to each other when the shortest path traced from the first camera to the second camera reaches the second camera or the surveillance area of the second camera after coming into contact with a surveillance area that is neither the surveillance area of the first camera nor the surveillance area of the second camera; and an output camera image select unit configured to select an output camera image from among a plurality of camera images based on the inter-camera link relation determined by the link determination unit, wherein each of the surveillance areas corresponds to one of the plurality of cameras and wherein, when there is an overlap region between the surveillance areas of the cameras, the surveillance area projection unit divides the overlap region between the cameras.

2. The surveillance camera management device according to claim 1, wherein
the link determination unit further calculates a link distance between the cameras determined to be linked to each other.

3. The surveillance camera management device according to claim 2, wherein,
when the shortest path traced from the first camera to the second camera determined to be linked to each other reaches one of the second camera and the surveillance area of the second camera after exiting the surveillance area of the first camera, the link determination unit determines the link distance between the first camera and the second camera to be a distance from the exit of the surveillance area of the first camera to one of the second camera and the entrance of the surveillance area of the second camera, and,
when the shortest path traced from the first camera to the second camera determined to be linked to each other reaches one of the second camera and the surveillance area of the second camera from the first camera without coming into contact with the surveillance area of the first camera, the link determination unit determines the link distance between the first camera and the second camera to be a distance from a registered position of the first camera to one of the second camera and the entrance of the surveillance area of the second camera.

4. The surveillance camera management device according to claim 1, wherein
the surveillance area projection unit divides the overlap region between the cameras, taking into account projection accuracy.

5. The surveillance camera management device according to claim 1, wherein,
when selecting a camera image of a predetermined camera as a camera image to be output to a main monitor, the output camera image select unit selects camera images of a predetermined number of cameras linked to the predetermined camera as camera images to be output to sub-monitors.

6. A surveillance camera management method performed by a computer, the method comprising:
projecting surveillance areas of a plurality of cameras onto a map having a surveillance region set thereon, the cameras being registered on the map;
searching for a shortest path between the cameras registered on the map;
determining an inter-camera link relation between the cameras based on the surveillance areas of the cameras projected onto the map and the shortest path between the cameras detected on the map, wherein the inter-camera link relation is determined by determining that a first camera and a second camera are linked to each other when the shortest path traced from the first camera to the second camera reaches one of the second camera and the surveillance area of the second camera without coming into contact with a surveillance area other than the surveillance area of the first camera and wherein the inter-camera link relation is further determined by determining that the first camera and the second camera are not linked to each other when the shortest path traced from the first camera to the second camera reaches the second camera or the surveillance area of the second camera after coming into contact with a surveillance area that is neither the surveillance area of the first camera nor the surveillance area of the second camera; and
selecting an output camera image from among a plurality of camera images based on the determined inter-camera link relation, wherein each of the surveillance areas corresponds to one of the plurality of cameras and wherein, when there is an overlap region between the surveillance areas of the cameras, the overlap region is divided between the cameras.

7. A non-transitory computer-readable storage device encoded with computer-executable instructions that, when executed by a computer, cause the computer to function as:
a surveillance area projection unit configured to project surveillance areas of a plurality of cameras onto a map having a surveillance region set thereon, the cameras being registered on the map;
a shortest path search unit configured to search for a shortest path between the cameras registered on the map;
a link determination unit configured to determine an inter-camera link relation between the cameras based on the surveillance areas of the cameras projected onto the map and the shortest path between the cameras detected on the map, wherein the link determination unit is configured to determine the inter-camera link relation by determining that a first camera and a second camera are linked to each other when the shortest path traced from the first camera to the second camera reaches one of the second camera and the surveillance area of the second camera without coming into contact with a surveillance area other than the surveillance area of the first camera and wherein the link determination unit is further configured to determine the inter-camera link relation by determining that the first camera and the second camera are not linked to each other when the shortest path traced from the first camera to the second camera reaches the second camera or the surveillance area of the second camera after coming into contact with a surveillance area that is neither the surveillance area of the first camera nor the surveillance area of the second camera; and
an output camera image select unit configured to select an output camera image from among a plurality of camera images based on the inter-camera link relation determined by the link determination unit, wherein each of the surveillance areas corresponds to one of the plurality of cameras and wherein, when there is an overlap region between the surveillance areas of the cameras, the surveillance area projection unit divides the overlap region between the cameras.

* * * * *